(12) United States Patent
Nightingale et al.

(10) Patent No.: US 9,952,879 B2
(45) Date of Patent: *Apr. 24, 2018

(54) APPLICATION PRE-LAYOUT IN BYTE-ADDRESSABLE PERSISTENT RANDOM ACCESS MEMORY

(75) Inventors: Edmund Nightingale, Redmond, WA (US); Ky Srinivasan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 972 days.

This patent is subject to a terminal disclaimer.

(21) Appl. No.: 13/598,616

(22) Filed: Aug. 30, 2012

(65) Prior Publication Data
US 2014/0068235 A1    Mar. 6, 2014

(51) Int. Cl.
G06F 9/00    (2006.01)
G06F 9/24    (2006.01)
(Continued)

(52) U.S. Cl.
CPC ........ G06F 9/4406 (2013.01); G06F 9/44573 (2013.01)

(58) Field of Classification Search
CPC ................................ G06F 9/44; G06F 9/4411
See application file for complete search history.

(56) References Cited

U.S. PATENT DOCUMENTS 6,446,254 B1    9/2002    Chapman et al.
6,564,286 B2    5/2003    DaCosta
(Continued)

FOREIGN PATENT DOCUMENTS

CN    1114155 C    7/2003
CN    101283330 A    10/2008
(Continued)

OTHER PUBLICATIONS

Benavides, et al., "The Enabling of an Execute-in-Place Architecture to Reduce the Embedded System Memory Footprint and Boot Time", Retrieved at <<http://www.academypublisher.com/ojs/index.php/jcp/article/download/03017989/370>> in the proceedings of Journal of computers, 2008. vol. 3, Issue 1, Sep. 23, 2011, pp. 79-89.

(Continued)

Primary Examiner — Mohammed Rehman
(74) Attorney, Agent, or Firm — Alleman Hall Creasman & Tuttle LLP

(57) ABSTRACT

A software layout system is described herein that speeds up computer system boot time and/or application initialization time by moving constant data and executable code into byte-addressable, persistent random access memory (BPRAM). The system determines which components and aspects of the operating system or application change infrequently. From this information, the system builds a high performance BPRAM cache to provide faster access to these frequently used components, including the kernel. The result is that kernel or application code and data structures have a high performance access and execution time with regard to memory fetches. Thus, the software layout system provides a faster way to prepare operating systems and applications for normal operation and reduces the time spent on initialization.

19 Claims, 6 Drawing Sheets

(51) Int. Cl.
*G06F 15/177* (2006.01)
*G06F 9/44* (2018.01)
*G06F 9/445* (2018.01)

(56) References Cited

U.S. PATENT DOCUMENTS

| | | | |
|---|---|---|---|
| 6,574,747 | B2 | 6/2003 | Ginsberg |
| 6,957,314 | B2 | 10/2005 | Beckert et al. |
| 7,159,091 | B1 | 1/2007 | Hatalkar et al. |
| 7,350,186 | B2 | 3/2008 | Coleman et al. |
| 7,590,839 | B2 | 9/2009 | van der Veen et al. |
| 7,653,794 | B2 | 1/2010 | Michael et al. |
| 7,707,185 | B1 | 4/2010 | Czezatke et al. |
| 8,078,910 | B1 | 12/2011 | Backensto et al. |
| 8,307,151 | B1* | 11/2012 | Caraccio ............. G06F 12/0223 711/103 |
| 8,891,319 | B2 | 11/2014 | Castro et al. |
| 2002/0129078 | A1 | 9/2002 | Plaxton et al. |
| 2004/0068480 | A1 | 4/2004 | Lam et al. |
| 2004/0193864 | A1 | 9/2004 | Tsai et al. |
| 2005/0080986 | A1 | 4/2005 | Park |
| 2006/0268327 | A1* | 11/2006 | Hagiwara et al. ........... 358/1.15 |
| 2007/0083746 | A1 | 4/2007 | Fallon et al. |
| 2008/0270811 | A1* | 10/2008 | Chow ....................... G06F 1/32 713/323 |
| 2009/0043846 | A1* | 2/2009 | Inoue ....................... G06F 3/14 709/204 |
| 2009/0259919 | A1* | 10/2009 | Kilzer ................. G06F 11/1068 714/773 |
| 2009/0320010 | A1 | 12/2009 | Chow et al. |
| 2010/0058041 | A1 | 3/2010 | John et al. |
| 2010/0058045 | A1 | 3/2010 | Borras et al. |
| 2010/0106895 | A1 | 4/2010 | Condit et al. |
| 2010/0107158 | A1 | 4/2010 | Chen et al. |
| 2010/0180066 | A1 | 7/2010 | Powell |
| 2010/0275241 | A1 | 10/2010 | Srinivasan |
| 2010/0287435 | A1* | 11/2010 | Tedrow et al. ............... 714/748 |
| 2011/0202782 | A1* | 8/2011 | Malhi et al. .................. 713/323 |
| 2011/0265182 | A1* | 10/2011 | Peinado ................ G06F 21/554 726/24 |
| 2014/0208047 | A1* | 7/2014 | Vembu et al. ................. 711/161 |

FOREIGN PATENT DOCUMENTS

| | | |
|---|---|---|
| CN | 101673245 A | 3/2010 |
| EP | 0810522 A2 | 12/1997 |
| JP | H10198570 A | 7/1998 |
| JP | 2005011120 A | 1/2005 |
| JP | 2009512020 A | 3/2009 |
| WO | 2014035710 A1 | 3/2014 |

OTHER PUBLICATIONS

Condit, J. et al., "Better I/O Through Byte-Addressable, Persistent Memory," Proceedings of the ACM SIGOPS 22nd Symposium on Operation Systems Principles (SOSP'09), Oct. 11, 2009, Big Sky, Montana, 14 pages.

State Intellectual Property Office of the People's Republic of China, Office Action and Search Report Issued in Application No. 201380045529.9, dated Dec. 13, 2016, 16 pages.

Japan Patent Office, Office Action Issued in Japanese Patent Application No. 2015-529856, dated Jul. 6, 2017, Japan, 6 pages. (Submitted with English translation of Office Action).

"Final Office Action Issued in U.S. Appl. No. 13/598,621", dated Jun. 10, 2016, 12 Pages.

"Non-Final Office Action Issued in U.S. Appl. No. 13/598,621", dated Oct. 20, 2016, 13 Pages.

"Non-Final Office Action Issued in U.S. Appl. No. 13/598,621", dated Apr. 22, 2015, 11 Pages.

"Notice of Allowance Issued in U.S. Appl. No. 13/598,621", dated Apr. 25, 2017, 17 Pages.

"Second Office Action Issued in Chinese Patent Application No. 201380045529.9", dated Jul. 3, 2017, 7 Pages.

"Office Action Issued in Chinese Patent Application No. 201380045586.7", dated Jan. 3, 2017, 16 Pages.

Zhao, et al., "Experimental Study of Virtual Machine Migration in Support of Reservation of Cluster Resources", In the Proceedings 2nd International Workshop on Virtualization Technology in Distributed Computing, Nov. 2007, 8 Pages.

Bradford, et al., "Live Wide-Area Migration of Virtual Machines Including Local Persistent State", In the Proceedings of the 3rd International Conference on Virtual Execution Environments, Jun. 13, 2007, 11 Pages.

"International Search Report and Written Opinion Issued in PCT Application No. PCT/US2013/055635", dated Nov. 22, 2013, 9 Pages.

"International Search Report and Written Opinion Issued in PCT Application No. PCT/US2013/055636", dated Nov. 22, 2013, 9 Pages.

"Non Final Office Action Issued in U.S. Appl. No. 13/598,621", dated Dec. 24, 2015, 11 Pages.

\* cited by examiner

APPLICATION PRE-LAYOUT IN BYTE-ADDRESSABLE PERSISTENT RANDOM ACCESS MEMORY

BACKGROUND

Computer systems go through a boot phase when they are turned on that prepares the computer for use and turns over control of the hardware to the operating system. Generally, the hardware includes some firmware that initializes the hardware, such as Basic Input/Output System (BIOS) and Extended Firmware Interface (EFI). This firmware then generally looks to a disk drive to identify a master boot record (MBR) or other first set of instructions to run. These instructions may invoke a boot loader, which then loads and initializes the operating system (or potentially offers a menu of operating systems from which to boot the computer system). Similarly, once the operating system is loaded applications also go through an initialization phase, during which software and data modules associated with the application are loaded, memory state is initialized (e.g., with resources or other data), and so forth.

These boot and initialization processes are often time consuming. Not only can sophisticated hardware take time to initialize and reach an operational state, but software takes time to load from disk and time to run to carry out various initialization tasks. The user of the computer system cannot use the system or application until this process is complete, and thus time is wasted. In addition, during other periods such as waking a computer from a sleep state, low-power state, or hibernation the system may perform a similar boot-like process that delays the user's use of the computer system. For mobile devices, game consoles, routers, and other devices that are internally implemented as computer systems even though consumers may view them as integrated consumer electronics, the time to boot can significantly detract from the availability of the device.

In standard operating systems, constant code that is rarely updated such as the kernel is read from legacy drives in the same way as user application code. This leads to less than optimal boot times, as the operating system brings itself into an operating state via a complex load sequence from hard drive or other relatively slow resources. Even with modern flash-based disk drives, the number of reads and writes to load software code and set initial configuration can consume a noticeable amount of time for the user. The same is true of applications, which may involve accessing and loading dozens of libraries, and subsequently initializing memory areas specified by the libraries with data. A large portion of this data is constant data that is the same each time the operating system or application loads. Past techniques have focused on ways to rearrange this data on existing, non-byte-addressable hard drives, which still involves noticeable delay, or on performing the normal initialization sequence early before an application is requested by the user (see, e.g., MICROSOFT™ WINDOWS™ Prefetch and SuperFetch features).

SUMMARY

A software layout system is described herein that speeds up computer system boot time and/or application initialization time by moving constant data and executable code into non-volatile high-performance memory (e.g., ReRAM or PCM), while leaving changing data on volatile storage such as DRAM. The system determines which components and aspects of the operating system or application are constant and subject to no or minimal change. From this information, the system builds a high performance memory ReRAM/PCM cache to provide faster access to these frequently used components, including the kernel. The result is that kernel or application code and data structures have a high performance access and execution time with regard to memory fetches. The system can perform a similar process with respect to applications. Software applications also go through common startup sequences to initialize process data structures, threads, resources, and so forth that can be predicted and sped up using the techniques described herein. In some cases, such as where the high-performance cache is directly byte addressable, the system may even boot or execute directly from the cache. Thus, the software layout system provides a faster way to prepare operating systems and applications for normal operation and reduces the time spent on initialization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
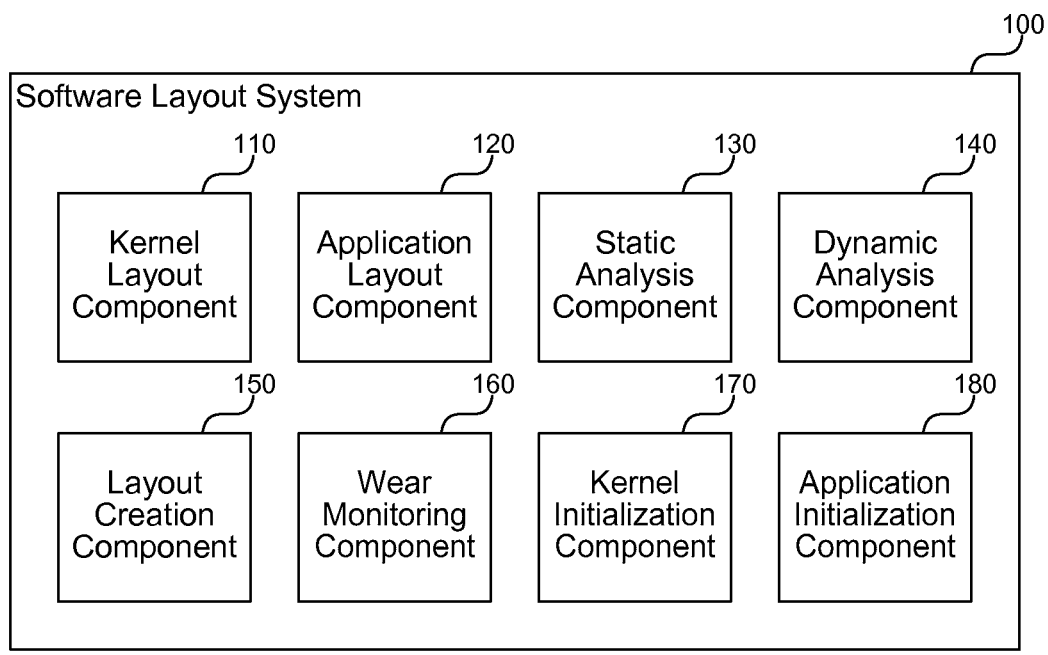
FIG. 1 is a block diagram that illustrates components of the software layout system, in one embodiment.

A software layout system is described herein that speeds up computer system boot time and/or application initialization time by moving constant data and executable code into non-volatile high-performance memory (e.g., ReRAM or PCM), while leaving changing data on volatile storage such as DRAM. The system determines which components and aspects of the operating system or application are constant and subject to no or minimal change. From this information, the system builds a high performance memory ReRAM/PCM cache to provide faster access to these frequently used components, including the kernel. For example, the system may keep the kernel data structures and code in non-volatile and high performance ReRAM, while leaving dynamic/changing data in volatile DRAM memory. The result is that kernel or application code and data structures have a high performance access and execution time with regard to memory fetches.

The system can perform a similar process with respect to applications. Software applications also go through common startup sequences to initialize process data structures, threads, resources, and so forth that can be predicted and sped up using the techniques described herein. For example, the system can identify parts of an application's startup sequence that reference data that rarely changes, and can cache that data in a non-volatile, high performance memory cache where it can be accessed each time the application starts up. In some embodiments, the system also lays out the data in a manner for fast transfer into memory to make the kernel or a process active. For example, the system may determine the final layout of the operating system or an application in memory during operation, store an image of that layout in a high-performance cache, and then next time the operating system or an application is selected to start, the system can use direct memory access (DMA) or other high performance copying techniques to transfer the pre-layout boot/initialization image into memory for execution. In some cases, such as where the high-performance cache is directly byte addressable, the system may even boot or execute directly from the cache. Thus, the software layout system provides a faster way to prepare operating systems and applications for normal operation and reduces the time spent on initialization.

As described herein, the software layout system operates in two conceptual phases: layout and startup. During the layout phase, the system analyzes one or more operating systems or applications to determine how the operating system or application initializes itself. The system may use a variety of static and dynamic analysis techniques that are well known in the art to analyze binary executable files, in-memory data, live execution, or other information to identify instructions and data used by the operating system or application during startup. For example, the portable executable format (PE) used by MICROSOFT™ WINDOWS™ operating systems contains sections of data that can be flagged as read only or read/write, and the software layout system can use this information to place the read only sections in ReRAM or another cache. The system may also track historical change information to build a picture about which instructions or data rarely change. This rarely changing data is then targeted for loading from faster storage, such as ReRAM. The system creates a layout image or other data structure that describes the results of the analysis and provides software instructions and/or data for storage using the faster memory.

During the startup phase, the system leverages the previously performed layout work to make startup of an operating system or application faster. This may include directing BIOS or other startup instructions to directly access the initialization image from the ReRAM cache, or may include instructions for using DMA or other fast transfer method to copy the ready-to-execute image from the cache into volatile memory for traditional execution. Because such transfers are faster than loading dozens of images piecemeal, there is a substantial speed up of the initialization process and a reduction in the time to when the application is ready for use by a user.

In any modern operating system, data is either mutable or immutable. Data such as that contained within an application's heap is often mutable, as it changes during application execution. The executable image (software code) and global constants are examples of immutable data. Currently, mutable and immutable data are both kept on durable storage, such as flash or a hard drive, and cached in DRAM to make it accessible to an application during execution. Hard drives and flash memory are not generally byte-addressable, so execution cannot typically directly occur from such devices. This is why such data is first copied to DRAM, which is byte addressable, where it can be executed and accessed by executing software code.

Generally, the current memory hierarchy has differentiation between slow, persistent, bulk access technologies and fast, byte-addressable, non-persistent technologies. Byte addressable, persistent memory technologies, such as Phase Change Memory, ReRAM, or memristors, provide memory that bridges the gap between DRAM and persistent storage by providing storage that is both byte-addressable as well as persistent. We refer to these technologies as BPRAM herein (byte-addressable, persistent random-access memory). These different memory technologies all have varying performance and durability (wear) guarantees, but they introduce a new type of memory that can be used in modern computers. The use of BPRAM to store immutable objects can improve performance, free up DRAM, and save power, and the software layout system identifies data structures within an application or operating system that can be migrated to BPRAM to derive these advantages.

One new consideration introduced by this use of BPRAM is wear. Since the number of writes to BPRAM devices before wearing out is often far less than DRAM or a hard disk, care is often needed to ensure that data is not lost due to the technology wearing out. Therefore, the simplest use of BPRAM is to first make it available on a memory bus side-by-side with DRAM. Next, one could consider putting only application executables onto the available persistent memory. Rather than fetch the application binaries off of slower, bulk storage and caching the binaries in volatile memory, the executables may simply be stored and executed directly out of BPRAM. Since executables are updated far less frequently than application data, one could be certain that the BPRAM would have a long lifetime. A concern might be that execution would slow down, since BPRAM is often slower than DRAM, however CPU prefetching and caching may hide much of the difference, and BPRAM can be far faster than hard drives. The executables cached in BPRAM can include any type of binary, including applications, libraries, dynamically linked libraries (DLLs), or the components that constitute an operating system.

Beyond simply caching executables, other portions of the computing environment can also be cached in BPRAM. For example, when code is compiled, data defined as 'constant' or 'read only' (as marked in the executable format or determined by another method) can be put into BPRAM rather than kept in DRAM. Applications that use a large amount of static data for computations can free up DRAM and place those data structures in BPRAM instead.

Finally, a run-time can be designed to migrate data structures in and out of BPRAM, depending upon their access patterns. For example, a hash table might really be represented as a state machine where it is updated frequently, then accessed exclusively by readers, and then updated again. These types of access patterns might mean that the data structure could be put into BPRAM while it is accessed by readers. However, when applications attempt to update the data structures by writing to them, the data structures would be moved back into volatile (DRAM) memory.

Applications benefit from this availability in a few different ways. First, it eliminates the need for applications to serialize data structures to disk when a process exits. Of course, this is only useful if the application can reason about the data structures' consistency. When an application crashes, it might be that the data structure is no longer useful, and must be recreated from a copy (or snapshot) kept in another location. Second, application performance can be improved if the application has immediate access to persistent versions of its data structures. Finally, for BPRAM that has a lower energy footprint than DRAM, a meaningful portion of DRAM could be replaced with BPRAM to lower the overall energy footprint of a computing machine by keeping a portion of its data in BPRAM.

In standard operating systems, constant code that is rarely updated such as the kernel is read from legacy drives in the same way as user application code. The software layout system determines which components of the operating system are constant and subject to no or minimal change, and builds a high performance ReRAM/PCM cache to provide fast access to these frequently used components, including the kernel. Thus, the system keeps the kernel data structures and code in non-volatile and high performance ReRAM, while leaving changing data in a volatile DRAM or other system.

User space applications are traditionally freshly loaded after the operating system has initialized and stabilized. However, to load the application later or on another operating system requires the application to be loaded piecemeal from libraries, and then user data loaded into memory forming the completed live image. The software layout system rapidly persists applications and their memory to ReRAM/PCM to allow fast transfer and fast reconstitution on the same or another system later. This suspend and resume removes the cost and burden of forming the application image using the operating system load sequence, and persists user data in a live state. These and other elements of the system are described in further detail below.

FIG. 1 is a block diagram that illustrates components of the software layout system, in one embodiment. The system 100 includes a kernel layout component 110, an application layout component 120, a static analysis component 130, a dynamic analysis component 140, a layout creation component 150, a wear monitoring component 160, a kernel initialization component 170, and an application initialization component 180. Each of these components is described in further detail herein.

The kernel layout component 110 determines data and software instructions used by an operating system kernel to boot up, and determines a layout of the kernel data and software instructions for byte-addressable persistent random-access memory (BPRAM) that will allow the kernel to boot from BPRAM. The kernel may boot directly from BPRAM, in the case of byte-addressable memory that is fast enough to allow for satisfactory performance, or indirectly form BPRAM by first copying the layout stored in BPRAM into another memory (e.g., DRAM). Some operating systems may have additional requirements, such as a secure boot process, that influence the decision of where code is run from. The kernel layout component 110 invokes the static analysis component 130, dynamic analysis component 140, and layout creation component 150 to determine a layout image for the kernel and to copy the determined image into BPRAM. The kernel layout component 110 may also alter boot data structures or other information to cause a computer system to boot from the image copied to BPRAM. The kernel layout component 110 may also determine a layout for other types of initialization of the kernel, such as restarts, hibernation, resumes from sleep, and so forth.

The application layout component 120 determines data and software instructions used by an application to initialize the application, and determines a layout of the application data and software instructions for BPRAM that will allow the application to initialize from BPRAM. Like the kernel, the application may run directly from BPRAM or the operating system may first copy the application layout stored in BPRAM to another memory device and execute the application from there. The layout may also be used to hibernate the application state and restore the application state rapidly, as is sometimes done using non-byte-addressable flash memory on today's mobile devices. An application may run with a combination of changing and relatively unchanging data, and the application layout component 120 may decide to place the relatively unchanging data in BPRAM, while the changing data is placed in volatile memory, such as DRAM. Data items such as the application binary, constants, and other types of data may be the same each time an application runs, or only rarely changed such as the application binary which may be updated several times per year or less. Keeping this information in BPRAM in a layout that is directly executable allows the application to come to a running state much faster than the load process typically followed today, during which dozens of binaries with instructions and data may be separately loaded from one storage location (e.g., a hard drive) and mapped into memory before the application is ready to run.

The application layout component 120 invokes the static analysis component 130, dynamic analysis component 140, and layout creation component 150 to determine a layout image for the application and to copy the determined image into BPRAM. The application layout component 120 may also alter operating system data structures or other information to cause the operating system to redirect requests to run the application to the image copied to BPRAM. The images created by the kernel layout component 110 and the application layout component 120 may be portable to other computer systems and/or operating systems, such that an image can be created on a computer system other than the one on which it will eventually run, and can then be copied to one or more computer systems on which the image will be run. This can allow virtualization environments, application hosts, mobile device manufacturers, or others to produce fast-loading application and operating system images that can be copied to any particular device's BPRAM to realize the advantages described herein.

The static analysis component 130 statically analyzes a software binary, data module, or other stored software data to determine how the software accesses instructions and data. The component 130 may analyze binary code (e.g., assembly), intermediate code (e.g., MICROSOFT™ intermediate language (IL) code), or other compiled or runnable versions of an application or operating system. Static analysis has advanced substantially over the last few years. The system 100 uses static analysis techniques to specifically focus on areas where the application stores code, data, and other resources. The static analysis component 130 may instrument the application binary to receive information or intercept particular actions of the application and may replace intercepted actions with new or additional actions. For example, if the component 130 discovers a call to an external module, the component 130 may replace the call with one to access an image of the external module in BPRAM. In this way, system 100 can discover the operation of applications and modify the behavior to enable the use of BPRAM to speed up application and operating system initialization. The component 130 may also access metadata, such as portable executable (PE) headers or other information in the software data that describes how particular code and/or data is used by the software being analyzed. For example, the PE format allows particular sections to be marked as executable code, read-only data, read/write data, resources (e.g., buttons, icons, dialog boxes, and so on), and so forth.

The dynamic analysis component 140 dynamically analyzes a running application to gather additional information related to the application's behavior that is difficult to determine with static analysis. Often applications include programming steps that frustrate static analysis (either intentionally or simply because the steps turn out that way after compilation). Dynamic analysis has information available, such as the contents of responses received from external components, the actual contents of memory used by the application, and user configuration information, for which only guesses or approximations are available during static analysis. In some cases, the system determines whether to perform static analysis, dynamic analysis, or both based on performance overhead or other known resource constraints. Dynamic analysis can potentially discover application behavior that is not found during static analysis. The dynamic analysis component 140 can also use dynamic analysis to confirm results of static analysis. The dynamic analysis component 140 provides the determined information to the layout creation component 150 to identify particular application code and data that is suitable for layout in BPRAM. For example, the dynamic layout component 150 may determine that particular data, although marked as read/write is not actually changed by an application. Conversely dynamic analysis can also identify portions of the application's data that are frequently changed. Applications may also contain behavior such as self-modifying code that indicates whether the applications code is read only and thus suitable for storage in BPRAM.

The layout creation component 150 creates an image in BPRAM for initializing an operating system or application based on the layout determined by the kernel layout component or the application layout component and stores the created image in BPRAM. The layout creation component 150 may access data, binary code, and other software information from one or more stored modules, data stores, and so forth to create an image that represents at least a portion of the application or operating system's in-memory data that is used to execute the operating system or application. The layout creation component 150 performs in advance of running an operating system or application many of the steps performed by a loader, heap, and other software components today. For example, whereas a loader is typically responsible for retrieving binary modules stored on a hard drive and placing the contents of those modules in a byte-addressable memory heap each time an application loads, the layout creation component 150 performs similar steps one time and places the resulting memory image into BPRAM where it can be ready each time the application is requested without loading the modules from slower storage each time. This significantly speeds up application load times.

The wear monitoring component 160 optionally monitors usage information of BPRAM to avoid writing to BPRAM a number of times in excess of a wear specification for the BPRAM. BPRAM often has a limited number of writes that it can accept, and thus it is helpful to perform wear leveling and similar techniques to ensure that the BPRAM is uniformly used (e.g., one section is not used each time while other sections go unused). In addition, the component 160 may make tradeoffs between which data to store in which devices based on a write frequency of the data determined through static and/or dynamic analysis. If a particular BPRAM device can handle the write load of particular data for a suitably long lifetime (e.g., the 5-10 years the device may be used in a particular computer system), then the system 100 may store the data at that location. For BPRAM devices with longer lifetimes (e.g., more write cycles), the system 100 may opt to include some infrequently written data in BPRAM even though the data is not complete read only. For example, application configuration parameters may change rarely enough that BPRAM is suitable. As BPRAM is developed over time that has a longer lifetime, the system can adapt to use BPRAM for more data.

The kernel initialization component 170 initializes the operating system using the image in BPRAM created by the layout creation component. Rather than booting the operating system in the traditional manner by loading the operating system binaries and data from sector-based persistent storage, such as rotating hard drives or solid-state disks, the component 170 executes the operating system directly from the BPRAM image, or by quickly copying the BPRAM image into DRAM or other memory. Because the layout created by the layout creation component 150 is based on how code and data are used during execution rather than where the code and data were originally stored, initializing the operating system from the stored image is much faster. Rather than potentially dozens of calls to slower storage, the kernel initialization component 170 can make use byte addressability to directly execute the operating system from BPRAM, or can use fast direct memory access (DMA) transfers to quickly copy the BPRAM image to DRAM or other memory.

The application initialization component 180 initializes the application using the image in BPRAM created by the layout creation component. Rather than initializing the application in the traditional manner by loading application binaries and data from sector-based persistent storage, such as rotating hard drives or solid-state disks, the component 180 loads the application directly from the BPRAM image, or by quickly copying the BPRAM image into DRAM or other memory. Because the layout created by the layout creation component 150 is based on how code and data are used during execution rather than where the code and data were originally stored, initializing the application from the stored image is much faster. Rather than potentially dozens of calls to slower storage, the application initialization component 180 can make use byte addressability to directly execute the application from BPRAM, or can use fast direct memory access (DMA) transfers to quickly copy the BPRAM image to DRAM or other memory.

The computing device on which the software layout system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
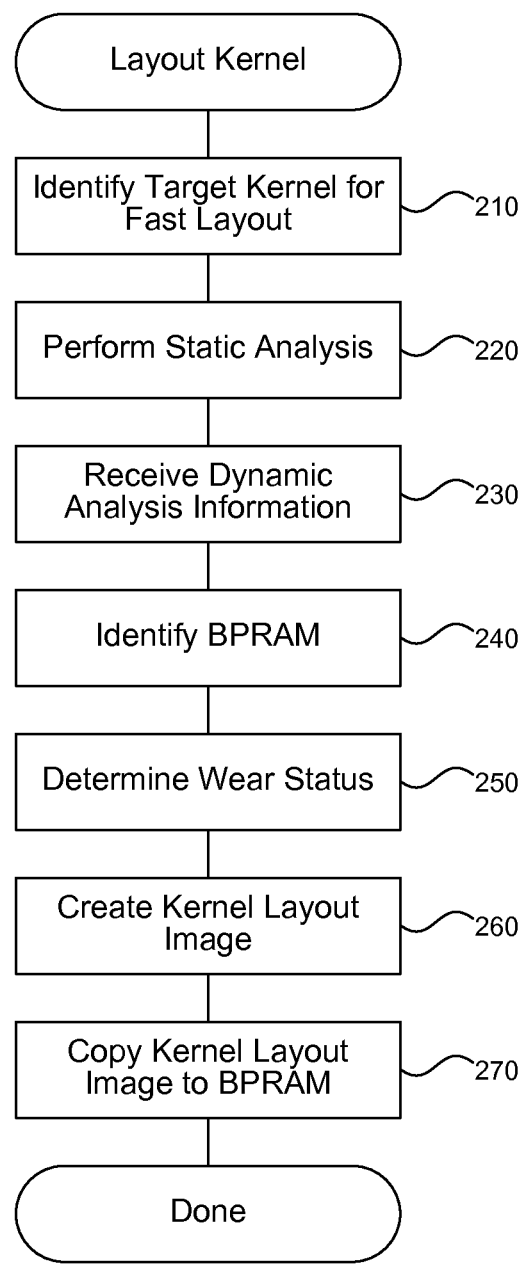
FIG. 2 is a flow diagram that illustrates processing of the software layout system to examine an operating system kernel to identify code and data for pre-layout in BPRAM, in one embodiment.
Figure 3:
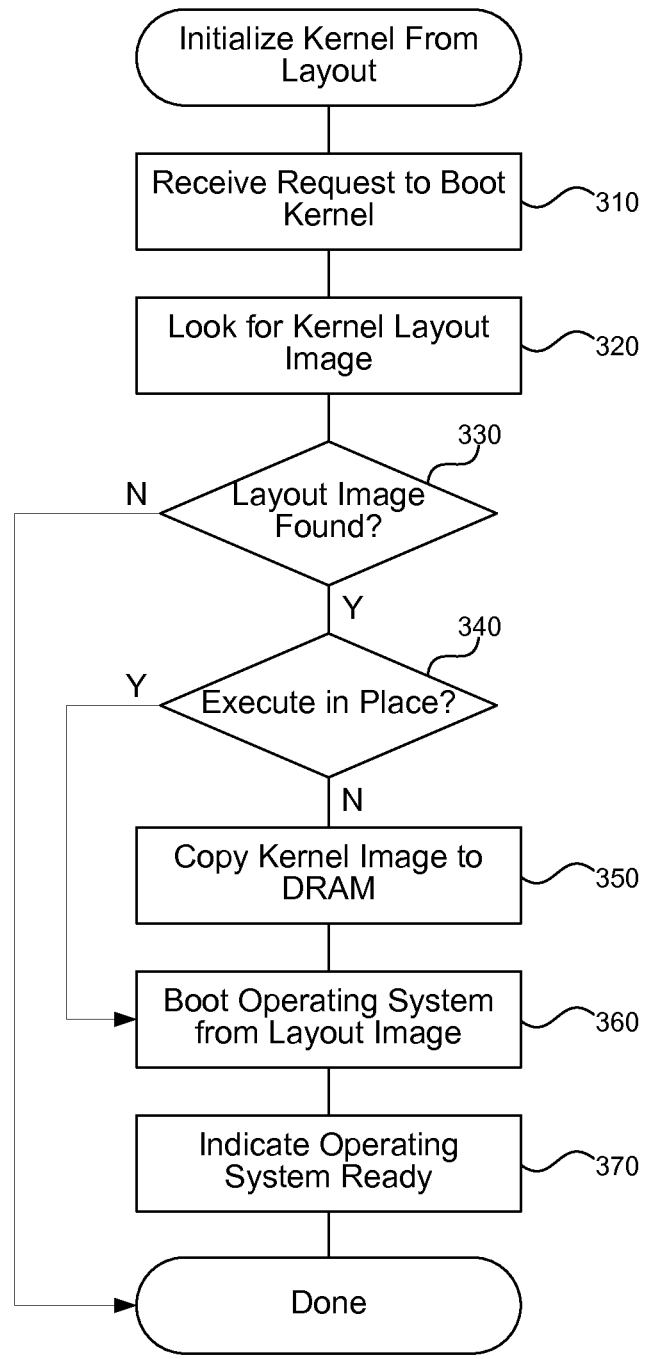
FIG. 3 is a flow diagram that illustrates processing of the software layout system to initialize an operating system kernel from BPRAM, in one embodiment.

FIG. 2 is a flow diagram that illustrates processing of the software layout system to examine an operating system kernel to identify code and data for pre-layout in BPRAM, in one embodiment. FIGS. 2 and 3 illustrate two different phases of operation of the system when applied to an operating system kernel. FIG. 2 illustrates the phase of determining a fast-boot layout and copying that layout to BPRAM, and FIG. 3 illustrates the phase of booting the kernel from the BPRAM image previously created by the steps of FIG. 2.

Beginning in block 210, the system identifies a target operating system kernel on which to perform fast layout to create a fast-booting image of the kernel, wherein the kernel has a stored format comprising one or more modules that differs in layout from the fast-booting image. The system may provide an administrative tool that can be run by an information technology (IT) person or may run automatically as part of an operating system to identify the kernel and start the process of creating a fast-booting image layout for storage in BPRAM. Identifying the kernel may include examining a boot record or other data structure of an existing data storage device, monitoring a boot up of a computer system, or receiving a module path that indicates the target kernel.

Continuing in block 220, the system performs static analysis on the identified target operating system kernel to determine one or more statically and dynamically linked modules associated with the kernel and to identify data used by the kernel that is sufficiently unchanging for storage in a byte-addressable, persistent random access memory (BPRAM). Various techniques exist in the art for performing static analysis, but the process generally begins by loading the main module associated with the kernel, examining the executable format to identify sections of the module (which may include resources, constant data, a linked module section referring to other modules, and one or more code sections containing executable code), and possibly disassembly of any identified machine code or other analysis techniques. In some embodiments, the system may also load any referenced modules, such as dynamically linked libraries, drivers for hardware, or other resources used by the kernel.

Continuing in block 230, the system optionally performs dynamic analysis by executing the operating system kernel and monitoring initialization of the kernel to identify additional modules and data associated with the kernel. Dynamic analysis may find modules and/or data in addition to those found through static analysis as well as providing confirmation of the items identified by static analysis. Dynamic analysis can provide information that is difficult to determine through static analysis, such as dynamically allocated memory structures used by the kernel, modules loaded dynamically only under certain conditions, parts of the kernel that differ based on a particular hardware environment, and so forth. During static and dynamic analysis, the system collects information about how the kernel initializes that can be used to produce a pre-laid out image from which the kernel can directly execute, skipping at least some of the traditional initialization steps.

In some embodiments, the system also captures signature information identifying each of the resources that are found. The identifying information may include a time stamp in a file system, a checksum, or other value that indicates when a particular resource has changed. The system can then use this information to determine when to perform layout analysis again, such as after operating system files or drivers are updated by an update from the manufacturer. The system may perform a process during each boot up or after a particular number of boot ups to walk through each known resource that contributed to the layout, determine whether any resource has changed, and if any resource has changed then initiate a new layout process to update the BPRAM image.

During static and dynamic analysis, the system may also observe and make note of any initialization that affects outside resources, such as hardware devices. Hardware such as graphics cards, input devices, displays, and other devices may expect a particular initialization sequence to place the hardware in a known state for receiving further requests. While the software layout system can perform a number of typical initialization steps in advance, steps that affect external resources may need to be performed each time the operating system boots. Thus, the system may track such initialization routines and store pointers or other references to these routines so that they can be performed when the operating system is loading from a pre-layout, fast-boot image.

Continuing in block 240, the system identifies a BPRAM device suitable for storing a pre-laid out image from which to fast boot the operating system kernel. BPRAM differs from typical flash memory, hard drives, and dynamic RAM (DRAM) previously available in that it is byte-addressable but also persistent. Byte addressable means that rather than loading from it sector by sector, as is typical for hard drives and flash that acts like a hard drive, each byte of the BPRAM can be directly addressed. Computer processors can typically only execute software code that is stored in byte-addressable memory. Persistent means that BPRAM holds the data stored there between power cycles (i.e., turning power to the device off and back on again). While typical DRAM is byte-addressable, it is not persistent, and while typical hard drives are persistent, they are not byte-addressable. BPRAM is thus new in that it possesses both of these qualities at the same time. Thus, an image of something to be executed can be formed in advance of a request to execute it, stored in BPRAM, and then executed from there directly or after copying to another memory device.

Continuing in block 250, the system optionally determines wear status information related to the BPRAM device. Although this may be solved over time with better devices, current BPRAM has the downside that it can be written to successfully only a limited number of times. While this number of times is sufficient to allow infrequent updating of the BPRAM, it is not sufficient to allow writing to BPRAM as often as a typical DRAM device or hard drive. Thus, the system may track wear status information to manage writing to the BPRAM device, and employ one or more techniques to prolong the useful lifetime of the BPRAM device. This information may include how many times each region of the device has been written to, which parts of the BPRAM are currently in use or not in use, a number of predicted writes available for each region, and so forth. Based on the wear status information, the system selects a location within the BPRAM for storing a layout image.

Continuing in block 260, the system creates a layout for a fast-booting image based on an in-memory layout of the kernel that is different from the stored format of the kernel, wherein the fast-booting image is ready for executing and is created before receiving a request to execute the kernel. A typical image of a kernel in memory is created by loading stored modules from hard drive storage into DRAM, but only upon request to execute the kernel. The system herein performs these steps in advance, and places the result in BPRAM, so that future requests to boot the kernel are made faster by not repeating those steps each time. The layout image may include the contents of one or more module code sections, one or more data sections, one or more read only heap regions created by the kernel, and so forth.

Continuing in block 270, the system copies the created layout image to the identified BPRAM device. The BPRAM device may include a particular write process through which the system copies the image to the device. The system may also identify a particular execution location within the kernel that represents a point past all of the typical initialization steps of the kernel. Because the layout image contains the kernel at a state after which a certain amount of initialization has been performed, when the kernel is run from BPRAM it can be started at an execution location later than usual. Thus, the system may overwrite an entry point address within the kernel image or make a similar modification that instructs the kernel to start from the appropriate point when it is run from BPRAM, thereby skipping the typical initialization steps. After block 270, these steps conclude.

FIG. 3 is a flow diagram that illustrates processing of the software layout system to initialize an operating system kernel from BPRAM, in one embodiment. As noted previously, FIG. 3 illustrates the phase of booting the kernel from the BPRAM image previously created by the steps of FIG. 2.

Beginning in block 310, the system receives a request to boot an operating system. Unlike applications, which typically initialize under the control of an operating system, operating systems typically initialize under control of a computer system's basic input/output system (BIOS), a boot loader, a hypervisor (in the case of virtualization), or other low-level boot code. The low-level boot code may identify the operating system from a master boot record (MBR), globally unique identifier (GUID) partition table (GPT), or other stored data structure that indicates bootable operating systems that are available. Once a particular operating system is identified, the low-level boot code typically identifies a main module of the operating system, loads that module, and passes control to the module's entry point. In the case of the software layout system, the low-level boot code may request the operating system to boot from BPRAM by calling the BPRAM image's entry point.

Continuing in block 320, the system identifies a previously laid out image within BPRAM from which the operating system can be executed without loading individual modules. The layout image is ready to execute in contrast to a typical stored format of an operating system that is stored as individual modules that are not ready to execute without completing a loading and initialization process. The loading and initialization process maps modules into memory, creates data regions in heaps or other memory areas, and so forth. In contrast, the software layout system's execution phase starts with those steps having already previously been completed at some earlier time. The software layout system can thus directly move to executing the operating system either directly from BPRAM, or by quickly copying the layout image from BPRAM to another memory device and executing the operating system from there.

Continuing in decision block 330, if the system identified a previously laid out image, then the system continues at block 340 to perform a fast boot, else the system completes and falls back on a traditional boot process that loads the stored modules associated with the operating system. The system may also determine (not shown) whether an identified previously laid out image is up to date with respect to a stored format of the operating system. If stored versions of the operating system's modules have been updated, then the previously laid out image may also need to be updated, and the system can perform such updates at this time or can flag the need for an update to be performed at a later time (e.g., before the next boot).

Continuing in decision block 340, the system determines whether the identified previously laid out image can be executed in place, and if so skips to block 360 to execute the BPRAM image, else the system continues at block 350. Even though BPRAM is byte-addressable, there may be good reason to execute the image elsewhere. For example, if the BPRAM device is slower than DRAM, it may be faster to perform a fast copy (e.g., using direct memory access (DMA) or other method) to DRAM and then execute from there. Alternatively or additionally, the BPRAM image may contain writeable sections that would unnecessarily wear out the BPRAM, but that can be executed fine in DRAM without wear concerns. For these and other reasons, a particular implementation of the software layout system may opt not to execute directly from BPRAM.

Continuing in block 350, the system copies the identified previously laid out image of the operating system to another memory device for execution. The copy may include DMA or other fast transfer techniques that can speed up the copy operation.

Continuing in block 360, the system begins execution of the operating system using the identified previously laid out image. The image at this point is either still in BPRAM and being executed directly, or is a copy from BPRAM to the other memory device. Execution of the operating system may include identifying an alternate entry point of the operating system based on initialization steps that are no longer needed due to the pre-layout process, as well as invoking any initialization routines for external resources that are performed to bring external resources in line with the state of the operating system caused by performing layout in advance.

Continuing in block 370, the system brings the operating system to a ready state for executing applications using the identified previously laid out image in a time faster than a traditional boot that loads the operating system from modules stored on sector-based storage devices. Because the system performs a large part of the boot process in advance, and these parts are typically the slowest due to the involvement of storage devices that are relatively slower than memory, the boot process can be dramatically sped up by the process described herein. After block 370, these steps conclude.

Figure 4:
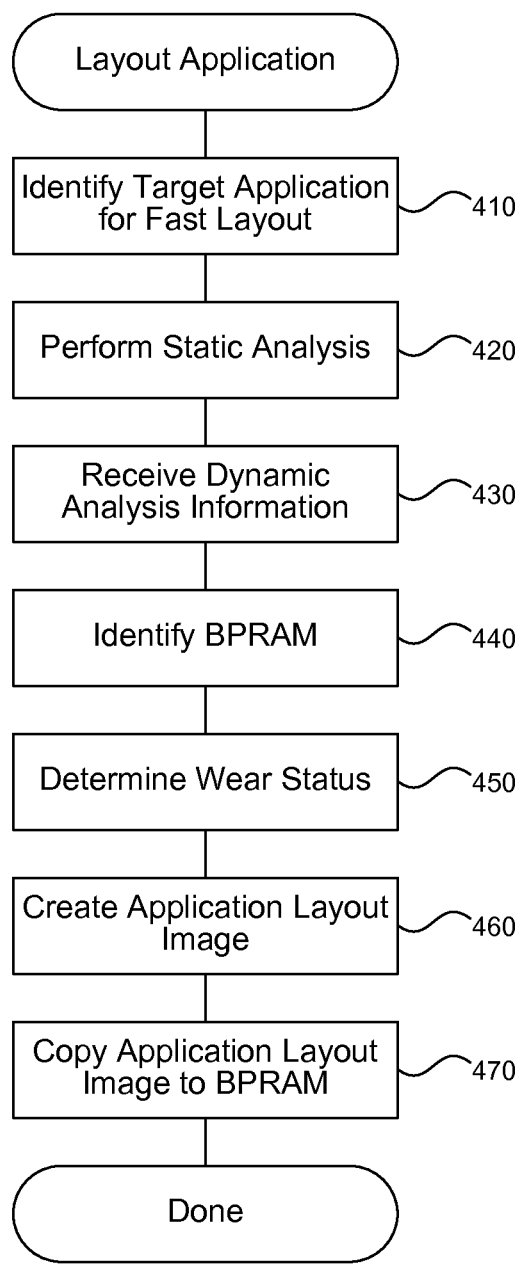
FIG. 4 is a flow diagram that illustrates processing of the software layout system to examine an application to identify code and data for pre-layout in BPRAM, in one embodiment.
Figure 5:
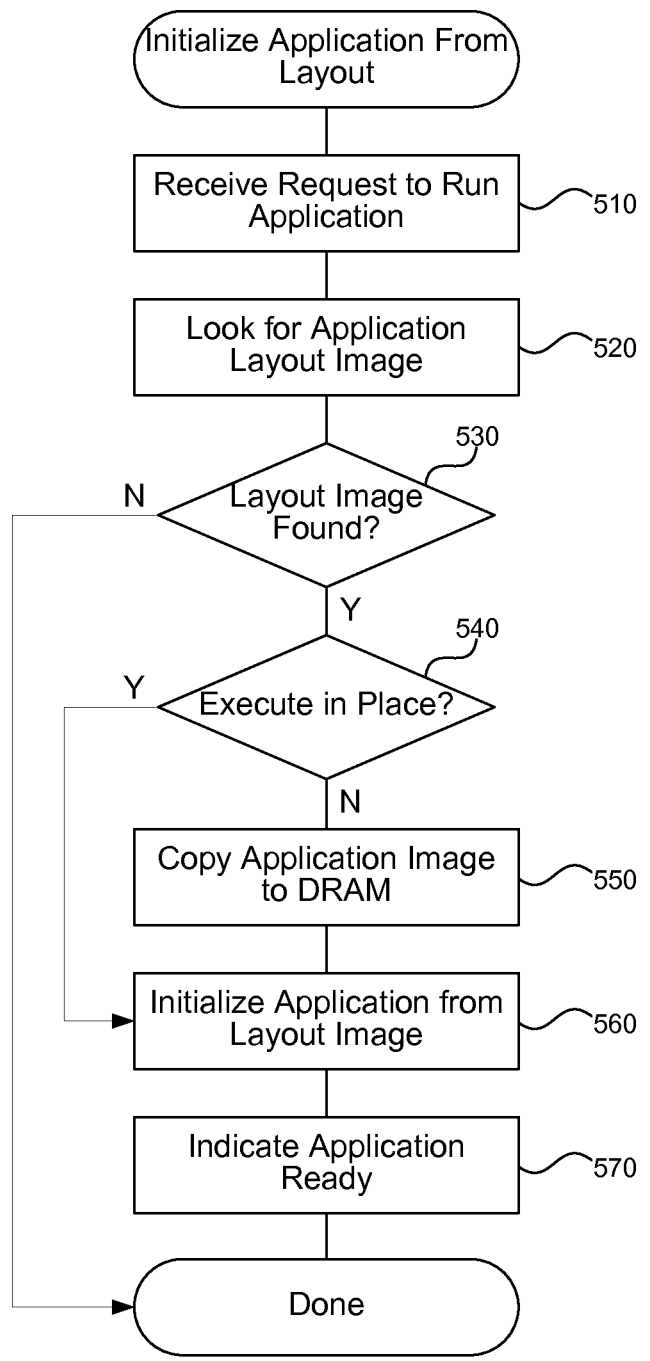
FIG. 5 is a flow diagram that illustrates processing of the software layout system to initialize an application from BPRAM, in one embodiment.

FIG. 4 is a flow diagram that illustrates processing of the software layout system to examine an application to identify code and data for pre-layout in BPRAM, in one embodiment. FIGS. 4 and 5 illustrate two different phases of operation of the system when applied to an application. FIG. 4 illustrates the phase of determining a ready-to-execute layout of the application and copying that layout to BPRAM, and FIG. 5 illustrates the phase of initializing the application from the BPRAM image previously created by the steps of FIG. 4.

Beginning in block 410, the system identifies a target application on which to perform fast layout to create a fast-initializing image of the application, wherein the application has a stored format comprising one or more modules that differs in layout from the fast-initializing image. The system may provide an administrative tool that can be run by an information technology (IT) person or may run automatically as part of an operating system to identify the application and start the process of creating a fast-initializing image layout for storage in BPRAM. Identifying the application may include examining a list of applications installed on an operating system, intercepting requests to execute applications, monitoring already running applications, or receiving a module path that indicates the target application.

Continuing in block 420, the system performs static analysis on the identified target application to determine one or more statically and dynamically linked modules associated with the application and to identify data used by the application that is sufficiently unchanging for storage in a byte-addressable, persistent random access memory (BPRAM). Various techniques exist in the art for performing static analysis, but the process generally begins by loading the main module associated with the application, examining the executable format to identify sections of the module (which may include resources, constant data, a linked module section referring to other modules, and one or more code sections containing executable code), and possibly disassembly of any identified machine code or other analysis techniques. In some embodiments, the system may also load any referenced modules, such as dynamically linked libraries, add-in extension modules, or other resources used by the application.

Applications, such as word processors, often allow third-party extensibility to add new functionality to the application through one or more add-in modules, and the system can include any installed add-ins in the layout image. In addition, applications may be built using one or more frameworks that may include a runtime in the form of one or more modules on which the application depends. For example, MICROSOFT™ .NET includes a common language runtime (CLR) that applications may leverage for common data structures and functions, and these may be included in BPRAM along with the application, or in a common manner that multiple such applications can leverage.

Continuing in block 430, the system optionally performs dynamic analysis by executing the application and monitoring initialization of the application to identify additional modules and data associated with the application. Dynamic analysis may find modules and/or data in addition to those found through static analysis as well as providing confirmation of the items identified by static analysis. Dynamic analysis can provide information that is difficult to determine through static analysis, such as dynamically allocated memory structures used by the application, modules loaded dynamically only under certain conditions, parts of the application that differ based on a particular hardware or operating system environment, and so forth. During static and dynamic analysis, the system collects information about how the application initializes that can be used to produce a pre-laid out image from which the application can directly execute, skipping at least some of the traditional initialization steps.

In some embodiments, the system also captures signature information identifying each of the resources that are found. The identifying information may include a time stamp in a file system, a checksum, or other value that indicates when a particular resource has changed. They system can then use this information to determine when to perform layout analysis again, such as after application files are updated by an update from the manufacturer. The system may perform a process during each execution of the application or after a particular number of executions to walk through each known resource that contributed to the layout, determine whether any resource has changed, and if any resource has changed then initiate a new layout process to update the BPRAM image.

During static and dynamic analysis, the system may also observe and make note of any initialization that affects outside resources, such as a system configuration database. While the software layout system can perform a number of typical initialization steps in advance, steps that affect external resources may need to be performed each time the application initializes. Thus, the system may track such initialization routines and store pointers or other references to these routines so that they can be performed when the application is loading from a pre-layout image.

Continuing in block 440, the system identifies a BPRAM device suitable for storing a pre-laid out image from which to initialize the application. BPRAM differs from typical flash memory, hard drives, and dynamic RAM (DRAM) previously available in that it is byte-addressable but also persistent. Byte addressable means that rather than loading from it sector by sector, as is typical for hard drives and flash that acts like a hard drive, each byte of the BPRAM can be directly addressed. Computer processors can typically only execute software code that is stored in byte-addressable memory. Persistent means that BPRAM holds the data stored there between power cycles (i.e., turning power to the device off and back on again). While typical DRAM is byte-addressable, it is not persistent, and while typical hard drives are persistent, they are not byte-addressable. BPRAM is thus new in that it possesses both of these qualities at the same time. Thus, an image of something to be executed can be formed in advance of a request to execute it, stored in BPRAM, and then executed from there directly or after copying to another memory device.

Continuing in block 450, the system optionally determines wear status information related to the BPRAM device. Although this may be solved over time with better devices, current BPRAM has the downside that it can be written to successfully only a limited number of times. While this number of times is sufficient to allow infrequent updating of the BPRAM, it is not sufficient to allow writing to BPRAM as often as a typical DRAM device or hard drive. Thus, the system may track wear status information to manage writing to the BPRAM device, and employ one or more techniques to prolong the useful lifetime of the BPRAM device. This information may include how many times each region of the device has been written to, which parts of the BPRAM are currently in use or not in use, a number of predicted writes available for each region, and so forth. Based on the wear status information, the system selects a location within the BPRAM for storing a layout image.

Continuing in block 460, the system creates a layout for a fast-initializing image based on an in-memory layout of the application that is different from the stored format of the application, wherein the fast-initializing image is ready for executing and is created before receiving a request to execute the application. A typical image of an application in memory is created by loading stored modules from hard drive storage into DRAM, but only upon request to execute the application. The system herein performs these steps in advance, and places the result in BPRAM, so that future requests to execute the application are made faster by not repeating those steps each time. The layout image may include the contents of one or more module code sections, one or more data sections, one or more read only heap regions created by the application, and so forth.

Continuing in block 470, the system copies the created layout image to the identified BPRAM device. The BPRAM device may include a particular write process through which the system copies the image to the device. The system may also identify a particular execution location within the application that represents a point past all of the typical initialization steps of the application. Because the layout image contains the application at a state after which a certain amount of initialization has been performed, when the application is run from BPRAM it can be started at an execution location later than usual. Thus, the system may overwrite an entry point address within the application image or make a similar modification that instructs the application to start from the appropriate point when it is run from BPRAM, thereby skipping the typical initialization steps. After block 470, these steps conclude.

FIG. 5 is a flow diagram that illustrates processing of the software layout system to initialize an application from BPRAM, in one embodiment. As noted previously, FIG. 5 illustrates the phase of initializing the application from the BPRAM image previously created by the steps of FIG. 4.

Beginning in block 510, the system receives a request to run an application. Applications typically initialize under the control of an operating system. The operating system may provide a shell through which users can launch applications, as well as application programming interfaces (APIs) through which applications can request other applications to run. Operating systems may also include a concept of services or daemons that are launched automatically upon initialization of the operating system or when particular events occur. Regardless of how the application is launched, the system receives a notification that the application has been requested. This can be done by running a device driver within the operating system that hooks loader requests or other steps commonly performed in response to requesting that an application be run. In some embodiments, the software layout system is built directly into the operating system as a native feature.

Continuing in block 520, the system identifies a previously laid out image within BPRAM from which the application can be executed without loading individual modules. The layout image is ready to execute in contrast to a typical stored format of an application, which is stored as individual modules that are not ready to execute without completing a loading and initialization process. The loading and initialization process maps modules into memory, creates data regions in heaps or other memory areas, and so forth. In contrast, the software layout system's execution phase starts with those steps having already previously been completed at some earlier time. The software layout system can thus directly move to executing the application either directly from BPRAM, or by quickly copying the layout image from BPRAM to another memory device and executing the application from there.

Continuing in decision block 530, if the system identified a previously laid out image, then the system continues at block 540 to perform a fast initialization of the application, else the system completes and falls back on a traditional initialization process that loads the stored modules associated with the application. The system may also determine (not shown) whether an identified previously laid out image is up to date with respect to a stored format of the application. If stored versions of the application's modules have been updated, then the previously laid out image may also need to be updated, and the system can perform such updates at this time or can flag the need for an update to be performed at a later time (e.g., before the next execution of the application).

Continuing in decision block 540, the system determines whether the identified previously laid out image can be executed in place, and if so skips to block 560 to execute the BPRAM image, else the system continues at block 550. Even though BPRAM is byte-addressable, there may be good reason to execute the image elsewhere. For example, if the BPRAM device is slower than DRAM, it may be faster to perform a fast copy (e.g., using direct memory access (DMA) or other method) to DRAM and then execute from there. Alternatively or additionally, the BPRAM image may contain writeable sections that would unnecessarily wear out the BPRAM, but that can be executed fine in DRAM without wear concerns. For these and other reasons, a particular implementation of the software layout system may opt not to execute directly from BPRAM.

Continuing in block 550, the system copies the identified previously laid out image of the application to another memory device for execution. The copy may include DMA or other fast transfer techniques that can speed up the copy operation.

Continuing in block 560, the system begins execution of the application using the identified previously laid out image. The image at this point is either still in BPRAM and being executed directly, or is a copy from BPRAM to the other memory device. Execution of the application may include identifying an alternate entry point of the application based on initialization steps that are no longer needed due to the pre-layout process, as well as invoking any initialization routines for external resources that are performed to bring external resources in line with the state of the application caused by performing layout in advance.

Continuing in block 570, the system brings the application to a ready state for use by a user using the identified previously laid out image in a time faster than a traditional initialization that loads the application from modules stored on sector-based storage devices. Because the system performs a large part of the application initialization process in advance, and these parts are typically the slowest due to the involvement of storage devices that are relatively slower than memory, the initialization process can be dramatically sped up by the process described herein. After block 570, these steps conclude.

Figure 6:
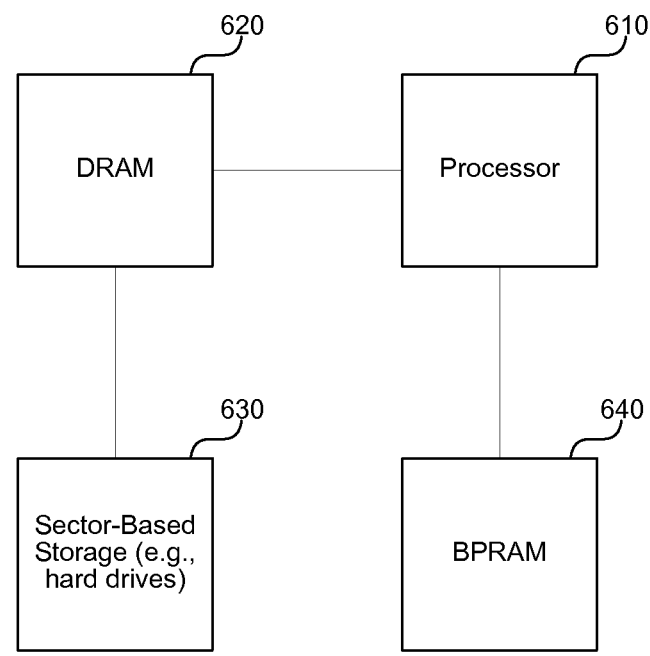
FIG. 6 is a block diagram that illustrates the relationship of various types of storage and data used by the software layout system, in one embodiment.

FIG. 6 is a block diagram that illustrates the relationship of various types of storage and data used by the software layout system, in one embodiment. A typical computer system includes a processor 610, non-persistent dynamic RAM 620, and sector-based persistent storage 630. Files are stored in sector-based persistent storage 630, including operating system and application executable modules as well as data files. During operation, the computer system loads operating system files and application files from the sector-based persistent storage 630 to the dynamic RAM 640 through instructions executed on the processor 610. These instructions reformat the executable modules from their stored format into a format ready for executing by the processor. The software layout system introduces an additional type of memory, BPRAM 640, which is both persistent and byte-addressable (i.e., not sector based). The computer system can execute operating systems and applications directly from BPRAM without first going through an initialization process that copies from a stored format to a format ready for executing. Rather, the BPRAM 640 already includes a format ready of executing of the applicable operating system and/or application.

In some embodiments, the software layout system includes a modified installer associated with an operating system that describes information used by an application for execution. Installation files associated with an application may include a manifest that provides information for an operating system and the installer to create a suitable layout image from which to fast-execute the application. Unlike static and dynamic analysis, which may still be performed, the installation information comes directly from the application manufacturer, and allows the manufacturer to tailor the layout process to better identify dependencies and other layout considerations of the application.

In some embodiments, the software layout system uses BPRAM that has a combination of sector-based and byte-addressable regions. Although the byte-addressable portion is described in detail earlier herein, the BPRAM may be partitioned in a manner that allows sector-based and byte-addressable portions to coexist. The sector-based portions may allow for the storage of portions of the application or operating system that cannot be laid out in advance, but that can still be loaded faster from sector-based BPRAM than from slower sector-based media (e.g., rotational hard drives).

In some embodiments, the software layout system intercepts calls from multiple applications, even those not using the full layout process described herein, to provide at least some application-referenced modules from BPRAM. For example, the system can intercept the common WIN32™ API call GetProcAddress, which returns the address of a function loaded from a dynamically-linked library (DLL), and rather than load the DLL and return address from a memory-mapped portion of the DLL, may return instead a pointer to the region in BPRAM where the DLL is already laid out in a ready-to-execute format. Similarly, the system can intercept kernel code to load modules such as device drivers, and redirect these calls to BPRAM.

In some embodiments, the software layout system provides mapping of virtual memory addresses to BPRAM transparently to running applications. For application and/or operating system data that is rarely changed and stored in BPRAM, the system may map the regions stored in BPRAM into standard virtual memory address space. In this way, applications or operating systems using pointers to this data do not know whether the data referenced by the pointers is stored in BPRAM, DRAM, or elsewhere, and continue to function as before but with the data potentially in a new location.

In some embodiments, the software layout system provides fault tolerance by falling back on a traditional initialization process if any errors occur during fast initialization. Updates to modules, bugs, or other errors may cause the fast initialization process to fail to place the operating system or application in a running state. In such cases, the system can fall back on the traditional initialization process and load the operating system or application from modules stored on sector-based media.

In some embodiments, the software layout system allows more instances of an application to run on particular computer hardware. Because much of the application is stored in a shareable portion of BPRAM, the amount of resources consumed by each new instance of the application is greatly reduced. This means that running multiple instances of the application need not consume a substantial quantity of resources. For some applications, it is common to run many instances and the ability to run even more is of great use.

From the foregoing, it will be appreciated that specific embodiments of the software layout system have been described herein for purposes of illustration, but that various modifications may be made without deviating from the spirit and scope of the invention. Accordingly, the invention is not limited except as by the appended claims.

We claim:

1. A computer-implemented method to examine an application to identify code and data for pre-layout in a byte-addressable, persistent random access memory (BPRAM), the method comprising:
    identifying a target application on which to perform fast layout to create a fast-initializing image of the target application, wherein the target application has a stored format comprising one or more modules that differ in layout from the fast-initializing image;
    performing static analysis on the target application by loading a main module associated with the application and examining an executable format of the main module to determine one or more statically and dynamically linked modules associated with the target application and to identify data used by the target application that is sufficiently unchanging for storage in BPRAM;
    performing dynamic analysis by executing the target application and monitoring initialization of the target application to identify additional modules and data associated with the target application and not identified during static analysis;
    identifying a BPRAM device suitable for storing the fast-initializing image;
    creating the fast-initializing image based on an in-memory layout of the target application identified during static and dynamic analysis that is different from the stored format of the target application, wherein the fast-initializing image is ready for executing and is created before receiving a request to execute the target application;
    copying the fast-initializing image to the identified BPRAM device; and
    after executing the target application from the fast-initializing image one or more times, updating the fast-initializing image on the BPRAM in accordance with an update provided by a manufacturer of the target application that changes the stored format of the target application.

2. The method of claim 1 wherein identifying the target application comprises providing an administrative tool that can be run by an information technology (IT) person to identify the target application and start the process of creating the fast-initializing image for storage in the BPRAIVI device.

3. The method of claim 1 wherein identifying the target application comprises providing a manifest with an installation package associated with the target application.

4. The method of claim 1 wherein performing static analysis comprises examining one or more add-in modules that extend a functionality of the target application.

5. The method of claim 1 wherein performing static and dynamic analysis comprises examining a runtime associated with the target application, and placing code and data associated with the runtime in the BPRAM device.

6. The method of claim 1 wherein performing dynamic analysis comprises collecting information about how the target application initializes that can be used to produce the fast-initializing image from which the target application can directly execute skipping at least some of the target application's typical initialization steps.

7. The method of claim 1 wherein performing static and dynamic analysis comprises capturing signature information identifying each of the modules identified during static and dynamic analysis, wherein the signature information indicates whether the fast-initializing image is out of date relative to the modules.

8. The method of claim 1 wherein performing static and dynamic analysis comprises identifying initialization that affects outside resources, so that the initialization can be performed when the target application is initialized from the fast-initializing image.

9. The method of claim 1 wherein identifying the BPRAM device comprises identifying a memory device that is persistent and byte addressable that has sufficient free space for storing the fast-initializing image.

10. The method of claim 1 wherein creating the fast-initializing image comprises creating a unified layout image with contents of one or more module code sections stored together in the BPRAM device.

11. The method of claim 1 wherein copying the fast-initializing image comprises identifying an execution location within the target application that represents a point past typical initialization steps of the target application that are unnecessary when starting from the fast-initializing image, and modifying an entry point of the target application based on the execution location.

12. A computer system for layout and execution of software applications using byte-addressable, persistent random access memory (BPRAM), the system comprising:
a processor and memory configured to execute software instructions embodied within the following components:
an application layout component that determines application data and software instructions used by an application to initialize the application, and determines a layout of the application data and software instructions that will allow the application to initialize from a BPRAM;
a static analysis component that statically analyzes software including a main module associated with the application by examining an executable format of the main module to determine how the software accesses instructions and data and to identify instructions and data suitable for storage in the BPRAM;
a dynamic analysis component that dynamically analyzes the application while running to gather additional information related to behavior of the application not identified during static analysis;
a layout creation component that creates an image for initializing the application based on the layout determined by the application layout component and stores the image in the BPRAM; and
an application initialization component that initializes the application upon request using the image in BPRAM created by the layout creation component;
wherein the processor and memory are further configured to, upon initializing the application from the image one or more times, update the image stored in the BPRAM in accordance with an update provided by a manufacturer of the application that changes a stored format of the application.

13. The system of claim 12 wherein the application layout component allows hibernating the application and restoring the application rapidly upon a resume event.

14. The system of claim 12 wherein the application layout component identifies infrequently changing data of the application for storing in the BPRAM.

15. The system of claim 12 wherein the application layout component invokes the static analysis component, dynamic analysis component, and layout creation component to create the image for initializing the application and to store the image in the BPRAM.

16. The system of claim 12 wherein the application layout component modifies one or more operating system data structures of an operating system to cause the operating system to redirect requests to run the application to the image stored in the BPRAM.

17. The system of claim 12 wherein the image is portable to other computer systems, such that the image can be copied to one or more other computer systems on which the application will be run from the image.

18. A computer executable method for controlling a computer system to initialize an application from byte-addressable, persistent random access memory (BPRAM), comprising:
receiving a request to run an application;
identifying a previously laid out image created after performing static and dynamic analysis on the application within a BPRAM from which the application can be executed without loading individual modules;
determining whether the identified previously laid out image can be executed in place, and if not copying the identified previously laid out image of the application to another memory device for execution;
beginning execution of the application using the identified previously laid out image, wherein execution of the application includes identifying an alternate entry point of the application based on initialization steps that are not needed due to execution of the application using the previously laid out image, as well as invoking any initialization routines for external resources that are performed to bring external resources in line with a state of the application caused by performing layout in advance;
bringing the application to a ready state for use by a user using the identified previously laid out image in a time faster than a traditional initialization that loads the application from modules stored on sector-based storage devices; and
upon executing the application using the previously laid out image one or more times, updating the previously laid out image in accordance with an update provided by a manufacturer of the application that changes a stored format of the application.

19. The method of claim 18 wherein copying the previously laid out image to the other memory device comprises using direct memory access (DMA) to facilitate the transfer from the BPRAM to the other memory device.

* * * * *